(12) United States Patent
Wang et al.

(10) Patent No.: US 11,096,193 B2
(45) Date of Patent: Aug. 17, 2021

(54) WORKING WIRELESS COMMUNICATION CHANNEL SELECTION BASED ON SPECTRAL ESTIMATION

(71) Applicant: SZ DJI TECHNOLOGY CO., LTD., Shenzhen (CN)

(72) Inventors: Naibo Wang, Shenzhen (CN); Wei Fan, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 104 days.

(21) Appl. No.: 16/674,520

(22) Filed: Nov. 5, 2019

(65) Prior Publication Data

US 2020/0077420 A1   Mar. 5, 2020

Related U.S. Application Data

(63) Continuation of application No. PCT/CN2017/083275, filed on May 5, 2017.

(51) Int. Cl.
*H04L 12/28* (2006.01)
*H04W 72/12* (2009.01)
(Continued)

(52) U.S. Cl.
CPC ....... *H04W 72/1231* (2013.01); *H04L 5/0005* (2013.01); *H04L 5/0044* (2013.01);
(Continued)

(58) Field of Classification Search
CPC ... H04B 17/309; H04W 16/14; H04W 72/085
(Continued)

(56) References Cited

U.S. PATENT DOCUMENTS

| | | | |
|---|---|---|---|
| 2008/0247375 A1* | 10/2008 | Muharemovic ... | H04W 72/0426 370/344 |
| 2011/0044376 A1* | 2/2011 | Lin ...................... | H04B 7/0608 375/130 |

(Continued)

FOREIGN PATENT DOCUMENTS

| | | |
|---|---|---|
| CN | 101547509 A | 9/2009 |
| CN | 101610094 A | 12/2009 |

(Continued)

OTHER PUBLICATIONS

The World Intellectual Property Organization (WIPO) International Search Report and Written Opinion for PCT/CN2017/083275 dated Jan. 31, 2018 7 pages.

*Primary Examiner* — John Pezzlo
(74) *Attorney, Agent, or Firm* — Anova Law Group, PLLC

(57) ABSTRACT

A method for selecting a working wireless communication channel based on spectral estimation includes determining a sub-set of wireless communication channels from a set of wireless communication channels of a working frequency band. A superposition of channel frequency bands of the wireless communication channels in the sub-set covers the working frequency band. The method further includes performing a noise level measurement on each wireless communication channel in the sub-set to obtain a spectral estimation result for each wireless communication channel in the sub-set. The method further includes calculating a spectral density distribution across the working frequency band based on the spectral estimation results of the wireless communication channels in the sub-set. The method further includes selecting, according to the spectral density distribution across the working frequency band, one of the
(Continued)

wireless communication channels from the set as the working wireless communication channel.

20 Claims, 11 Drawing Sheets

(51) Int. Cl.
*H04L 5/00* (2006.01)
*H04L 27/00* (2006.01)
*H04W 16/14* (2009.01)
*H04W 72/04* (2009.01)
*H04W 72/08* (2009.01)
*H04J 1/16* (2006.01)

(52) U.S. Cl.
CPC ........ *H04L 5/0062* (2013.01); *H04L 27/0006* (2013.01); *H04W 16/14* (2013.01); *H04W 72/0453* (2013.01); *H04W 72/085* (2013.01)

(58) Field of Classification Search
USPC ................................ 370/252, 329, 386, 430
See application file for complete search history.

(56) References Cited

U.S. PATENT DOCUMENTS

2015/0103751 A1\* 4/2015 Afkhami .................. H04B 3/54
370/329
2015/0305040 A1 10/2015 Xia et al.

FOREIGN PATENT DOCUMENTS

| CN | 101656599 A | 2/2010 |
| CN | 101835243 A | 9/2010 |
| CN | 102546061 A | 7/2012 |

\* cited by examiner

WORKING WIRELESS COMMUNICATION CHANNEL SELECTION BASED ON SPECTRAL ESTIMATION

CROSS-REFERENCE TO RELATED APPLICATION

This application is a continuation of International Application No. PCT/CN2017/083275, filed May 5, 2017, the entire content of which is incorporated herein by reference.

TECHNICAL FIELD

The present disclosure generally relates to wireless communication and, more particularly, to working wireless communication channel selection based on spectral estimation.

BACKGROUND

Currently, many wireless devices can operate in an unlicensed frequency band, subject to compliance with country/local-specific compliance requirements, such as maximum transmit power, out-of-band emissions, and other restrictions imposed by wireless regulatory authorities. A wireless device does not require an approval to use an unlicensed frequency band, and can freely determine a working frequency and an occupied bandwidth in the unlicensed frequency band.

Since the use of spectrum is not scheduled in advance, the unlicensed bands may have wireless frequency interference problems. For example, different unlicensed bands, e.g., BlueTooth and 2.4 GHz Wi-Fi, may have overlapping frequency band ranges. As another example, multiple wireless devices may work within a same unlicensed band, and the communication signals for the multiple wireless devices may be carried on close frequency channels. When more wireless devices work in the unlicensed bands, the wireless frequency interference problems may become more severe.

Currently, several techniques have been used to reduce the impact of the wireless frequency interference problems. For example, frequency hopping technique can be used to avoid wireless frequency interferences. As another example, a frequency channel having a relatively small interference can be selected. Many wireless devices working in the unlicensed bands usually provide automatic frequency selection function, such as the Auto Channel Select (ACS) functionality provided by Wi-Fi. For realizing the automatic frequency selection function, all available frequency channels are generally scanned one by one to determine the interference status of each frequency channel. Based on the scan results, a preferred frequency channel can be automatically selected.

However, because the number of frequency channels in an unlicensed frequency band is relatively large, it can generally take a long time to scan all the frequency channels. Since the automatic frequency selection process based on the scanning-by-channel scanning method requires a long scanning time, the frequency interference environment is more likely to change during the scanning time, thereby affecting the accuracy of frequency selection results.

SUMMARY

An aspect of the present disclosure provides a method for selecting a working wireless communication channel, comprising determining a sub-set of wireless communication channels from a set of wireless communication channels of a working frequency band, wherein a superposition of channel frequency bands of the wireless communication channels in the sub-set covers the working frequency band; performing a noise level measurement on each of the wireless communication channels in the sub-set to obtain a spectral estimation result for each channel frequency band of the wireless communication channels in the sub-set; calculating, by a hardware processor, a spectral density distribution across the working frequency band based on the spectral estimation results of the channel frequency bands of the wireless communication channels in the sub-set; and selecting, according to the spectral density distribution across the working frequency band, one of the wireless communication channels from the set as the working wireless communication channel.

In some embodiments, determining the sub-set of the wireless communication channels includes selecting two or more of the wireless communication channels, such that a frequency band overlap between each two neighboring wireless communication channels in the sub-set is minimized.

In some embodiments, performing the noise level measurement includes performing at least one of a periodogram method, a Blackman-Tukey method, or Bartlett method.

In some embodiments, performing the noise level measurement includes: measuring a channel spectral density distribution in the channel frequency band of each wireless communication channel in the sub-set.

In some embodiments, measuring the channel spectral density distribution includes: measuring the channel spectral density distribution at a spectral resolution of 1 MHz.

In some embodiments, calculating the spectral density distribution of the working frequency band includes: calculating, based on the channel spectral density distributions in the channel frequency bands of the wireless communication channels in the sub-set, average spectral densities within overlapping regions between each two neighboring wireless communication channels in the sub-set.

In some embodiments, selecting one of the wireless communication channels from the set as the working wireless communication channel includes: calculating a power indicating value of each of a plurality of wireless communication channels in the set based on the spectral density distribution of the working frequency band; and selecting one wireless communication channel having a lowest power indicating value as the working wireless communication channel.

In some embodiments, selecting one of the wireless communication channels as the working wireless communication channel includes: calculating a power indicating value of each of the plurality of wireless communication channels in the set based on the spectral density distribution of the working frequency band; determining whether a difference between the total power densities of a first one of the wireless communication channels and a second one of the wireless communication channels is less than a preset threshold value, wherein the first one of the wireless communication channels has a lowest power indicating value, and the second one of the wireless communication channels has a second lowest power indicating value; calculating a variance of a spectral density distribution within each of the channel frequency bands of the first one of the wireless communication channels and the second one of the wireless communication channels; and selecting one of the first one of the wireless communication channels and the second one of the wireless communication channels that has a larger variance as the working wireless communication channel.

Another aspect of the present disclosure provides a wireless communication device, comprising a hardware processor and a wireless connector. The hardware processor is configured to select a sub-set of wireless communication channels from a set of wireless communication channels of a working frequency band, wherein a superposition of channel frequency bands of the wireless communication channels in the sub-set covers the working frequency band; perform a noise level measurement on each of the wireless communication channels in the sub-set to obtain a spectral estimation result for each frequency band of the wireless communication channels in the sub-set, calculate a spectral density distribution across the working frequency band based on the spectral estimation results of the channel frequency bands of the wireless communication channels in the sub-set, and select, according to the spectral density distribution across the working frequency band, one of the wireless communication channels from the set as the working wireless communication channel. The wireless connector is configured to connect the wireless communication device to a wireless communication network using the working wireless communication channel.

Another aspect of the present disclosure provides a non-transitory computer-readable medium storing computer-executable instructions that, when executed by a processor, cause the processor to perform a method for selecting a working wireless communication channel. The method comprises providing a sub-set of wireless communication channels from a set of wireless communication channels of a working frequency band, wherein a superposition of channel frequency bands of the wireless communication channels in the sub-set covers the working frequency band; performing a noise level measurement on each of the wireless communication channels in the sub-set to obtain a spectral estimation result for each frequency band of the wireless communication channels in the sub-set; calculating, by a hardware processor, a spectral density distribution across the working frequency band based on the spectral estimation results of the channel frequency bands of the wireless communication channels in the sub-set; and selecting, according to the spectral density distribution across the working frequency band, one of the wireless communication channels from the set as a working wireless communication channel.

Another aspect of the present disclosure provides an unmanned aerial vehicle comprising a housing and a hardware processor and a wireless connector held by the housing. The hardware processor is configured to provide a sub-set of wireless communication channels from a set of wireless communication channels of a working frequency band, wherein a superposition of channel frequency bands of the wireless communication channels in the sub-set covers the working frequency band; perform a noise level measurement on each of the wireless communication channels in the sub-set to obtain a spectral estimation result for each frequency band of the wireless communication channels in the sub-set, calculate a spectral density distribution across the working frequency band based on the spectral estimation results of the channel frequency bands of the wireless communication channels in the sub-set, and select, according to the spectral density distribution across the working frequency band, one of the wireless communication channels from the set as the working wireless communication channel. The wireless connector is configured to connect the unmanned aerial vehicle to a wireless communication network using the working wireless communication channel.

BRIEF DESCRIPTION OF THE DRAWINGS

Various objects, features, and advantages of the disclosure can be more fully appreciated with reference to the following detailed description of embodiments when considered in connection with the drawings, in which like reference numerals identify like elements unless otherwise specified. It should be noted that the drawings are merely examples for illustrative purposes according to various disclosed embodiments and are not intended to limit the scope of the present disclosure.

DETAILED DESCRIPTION

Exemplary embodiments of the disclosure will be described in more detail below with reference to the drawings. It is apparent that the described embodiments are some but not all of the embodiments of the present invention. Based on the disclosed embodiments, persons of ordinary skill in the art may derive other embodiments consistent with the present disclosure, all of which are within the scope of the present invention.

In accordance with various embodiments, the present disclosure provides methods, systems, and media for selecting a working wireless communication channel based on spectral estimation.

In some embodiments, the disclosed methods, systems, and media can be applicable to any suitable communication modules that can work in one or more unlicensed wireless frequency bands, including 2.4 GHz Wi-Fi, 3.6 GHz Wi-Fi, 5 GHz Wi-Fi, BlueTooth, HiperLAN, etc. For example, the disclosed methods, systems, and media can be applied to an unmanned aerial vehicle (UAV) communication module, an autonomous vehicle communication module, etc. As another example, the disclosed methods, systems, and media can be applied to a mobile phone communication module, a tablet computer communication module, a smart wearable device communication module, etc.

Generally, each unlicensed wireless frequency band can have a specific working frequency band range, and can include multiple, i.e., a set of wireless communication channels within the specific working frequency band range. A wireless communication channel, also referred to as a "channel" for short, has a central frequency and a bandwidth. The set of wireless communication channels in the working frequency band range are also referred to as a working set of wireless communication channels.

Figure 1:
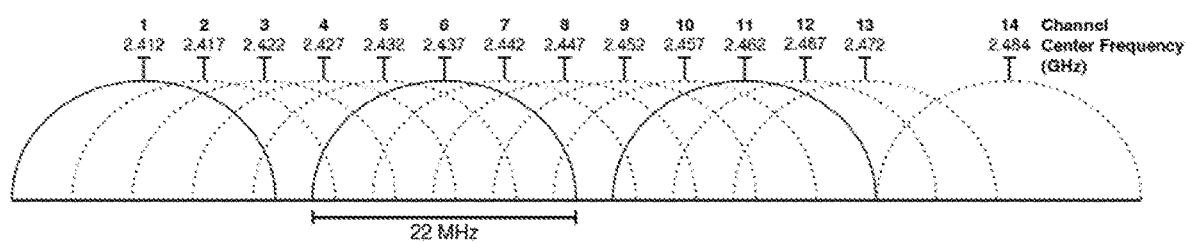
FIG. 1 illustrates a schematic diagram of a 2.4 GHz Wi-Fi band including 14 wireless communication channels.

FIG. 1 schematically shows a frequency band of 2.4 GHz Wi-Fi. As shown in FIG. 1, a frequency band range of the 2.4 GHz Wi-Fi is from about 2.401 GHz to about 2.495 GHz. That is, a wireless communication device employing the 2.4 GHz Wi-Fi technology can operate within this frequency band range. The frequency band range of the 2.4 GHz Wi-Fi generally includes fourteen channels. The first thirteen frequency channels (Channel No. 1 to Channel No. 13), i.e., the thirteen lower frequency channels, have central frequencies separated by about 5 MHz and each have a bandwidth of about 22 MHz. The fourteenth channel, i.e., the highest frequency channel, also has a bandwidth of about 22 MHz but has a central frequency deviated from the central frequency of the neighboring channel, i.e., the thirteenth channel, by about 12 MHz.

As another example, 5 GHz Wi-Fi generally operates within a frequency band range from about 4.915 GHz and to about 5.835 GHz and has up to 196 channels. In the 5 GHz Wi-Fi technology, different channels may have different bandwidths, such as about 10 MHz, about 20 MHz, about 40 MHz, about 80 MHz, etc.

Further, BlueTooth generally operates within a frequency band range from about 2.4 GHz to about 2.4835 GHz and has 79 channels, with each channel having a bandwidth of about 1 MHz.

In some embodiments, a channel in an unlicensed band may overlap with one or more adjacent channels. Thus, a signal received in one channel may also cover a portion of the bandwidth of an adjacent channel. Therefore, by determining the frequency interference status of one channel, the frequency interference status of at least a portion of the bandwidth of the adjacent channel can also be obtained. As such, in accordance with the present disclosure, a sub-set of channels of the unlicensed band can be selected to be scanned for obtaining the frequency interference status on the entire frequency band range of the unlicensed band. A channel in the sub-set can also be referred to as a "selected channel," a "scanning channel," or a "measurement channel," and the sub-set can also be referred to as a "scanning set" or a "measurement set."

Accordingly, a working wireless communication channel can be selected in a short time. For example, a general channel scanning and selecting process for 2.4 GHz Wi-Fi using the disclosed methods, systems, and/or media may only cost about 30% of the processing time as compared with the existing techniques.

Further, since the channel scanning and selecting process can be short, the frequency interference environment may not change much during the short period of time, so that the selection result of the channel scanning and selecting process by using the disclosed methods, systems, and media can be more reliable.

Figure 2:
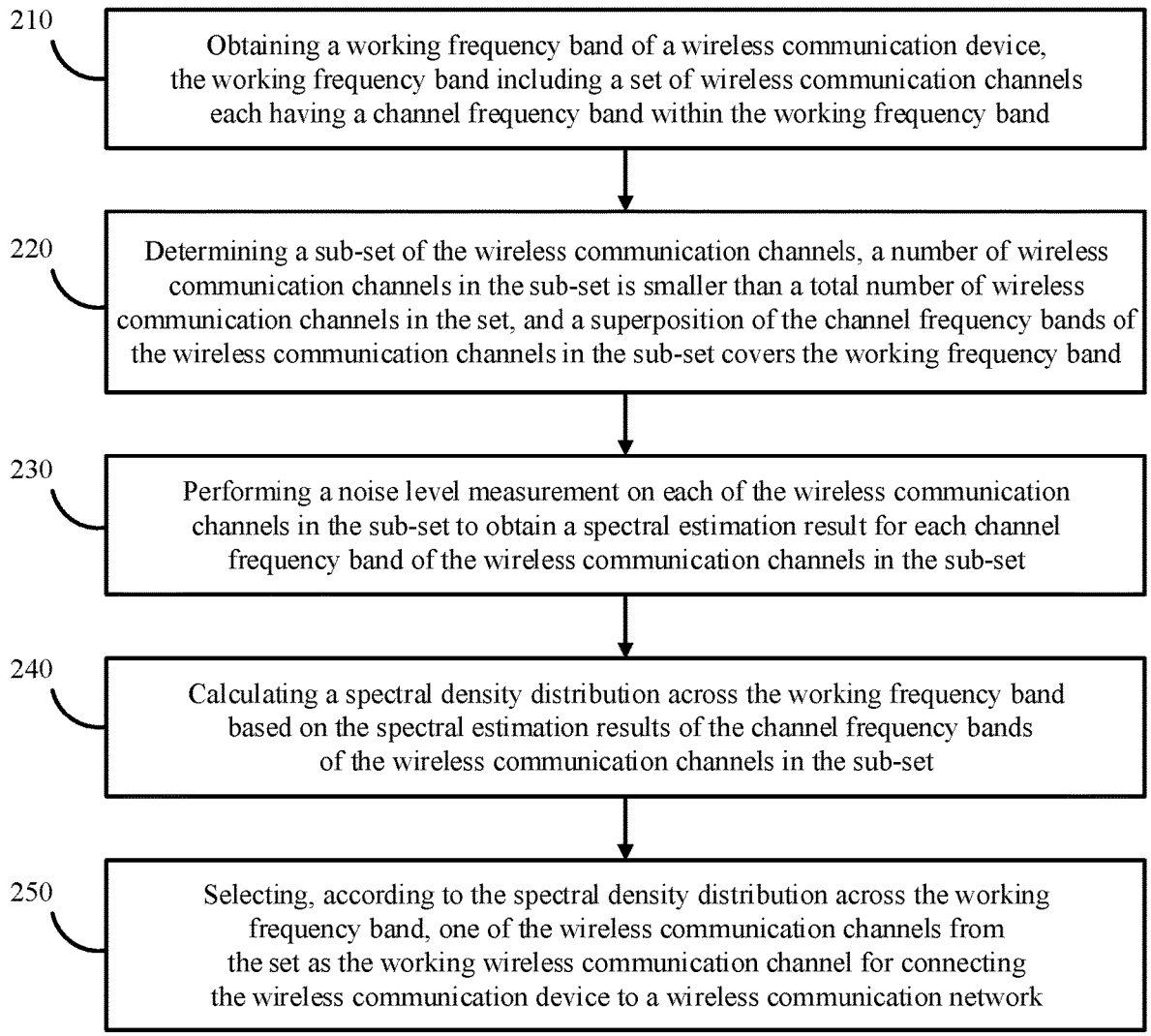
FIG. 2 illustrates a flowchart of an exemplary process for selecting a working wireless communication channel in accordance with some embodiments of the disclosure.
Figure 3A:
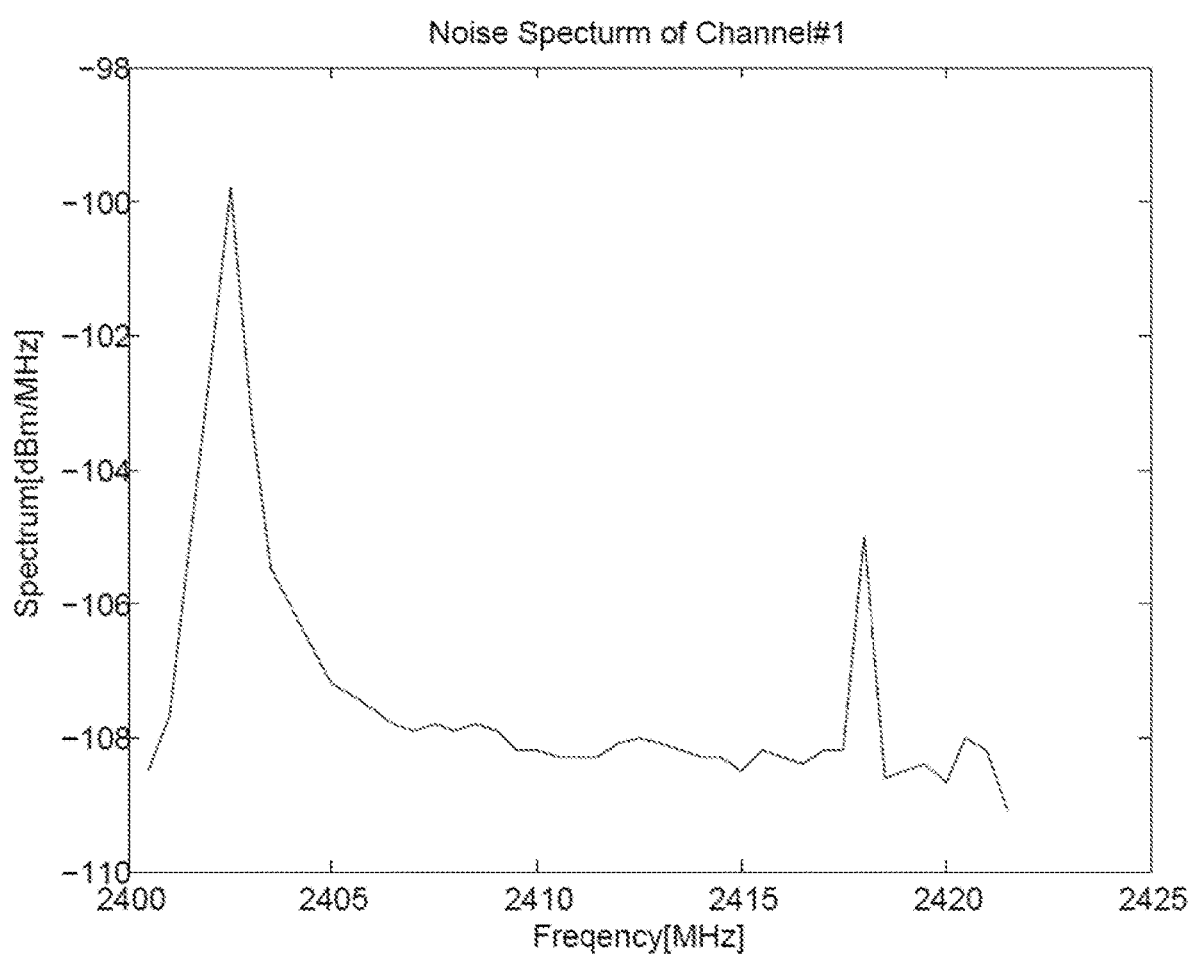
FIGS. 3A-3D illustrate schematic diagrams of exemplary spectral density measuring results of selected wireless communication channels in accordance with some embodiments of the disclosure.
Figure 3B:
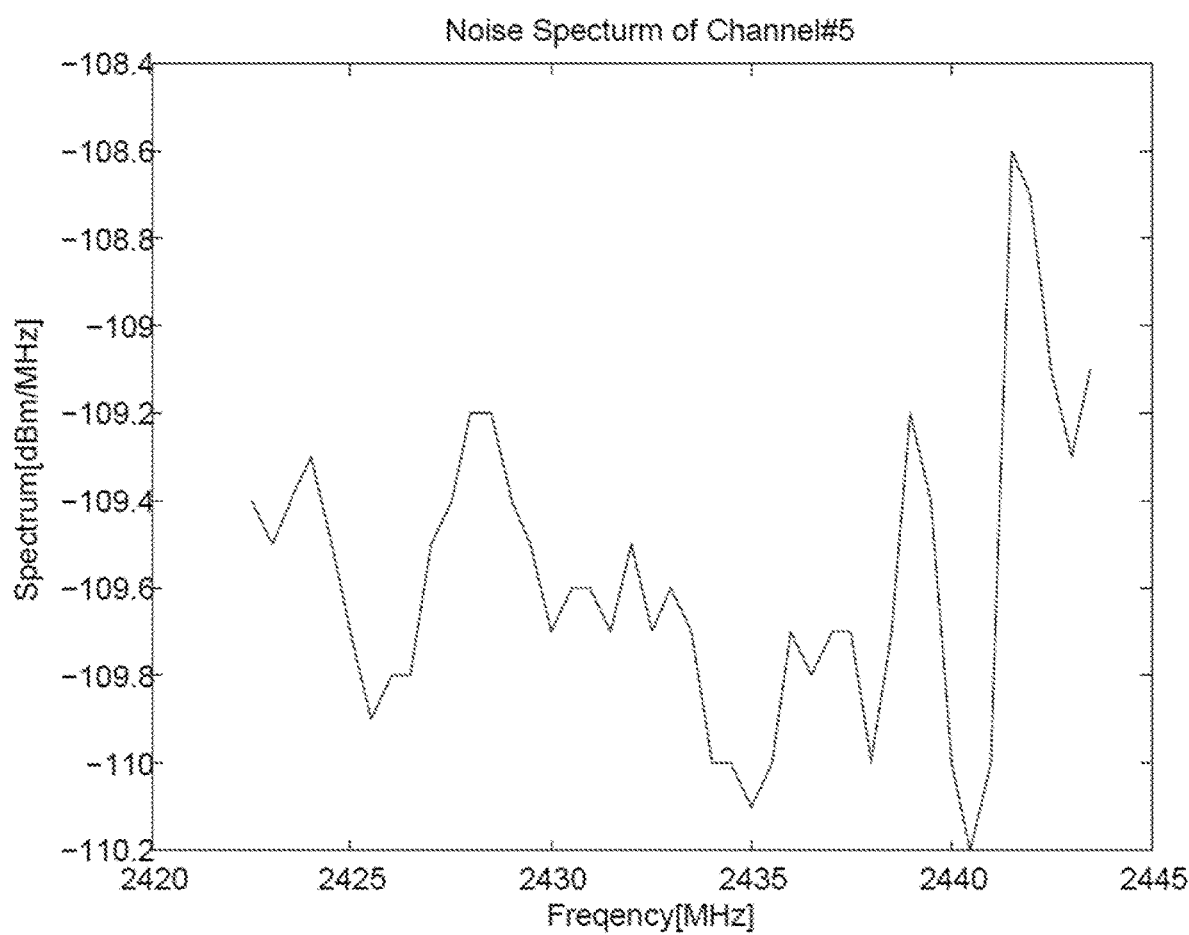
Figure 3C:
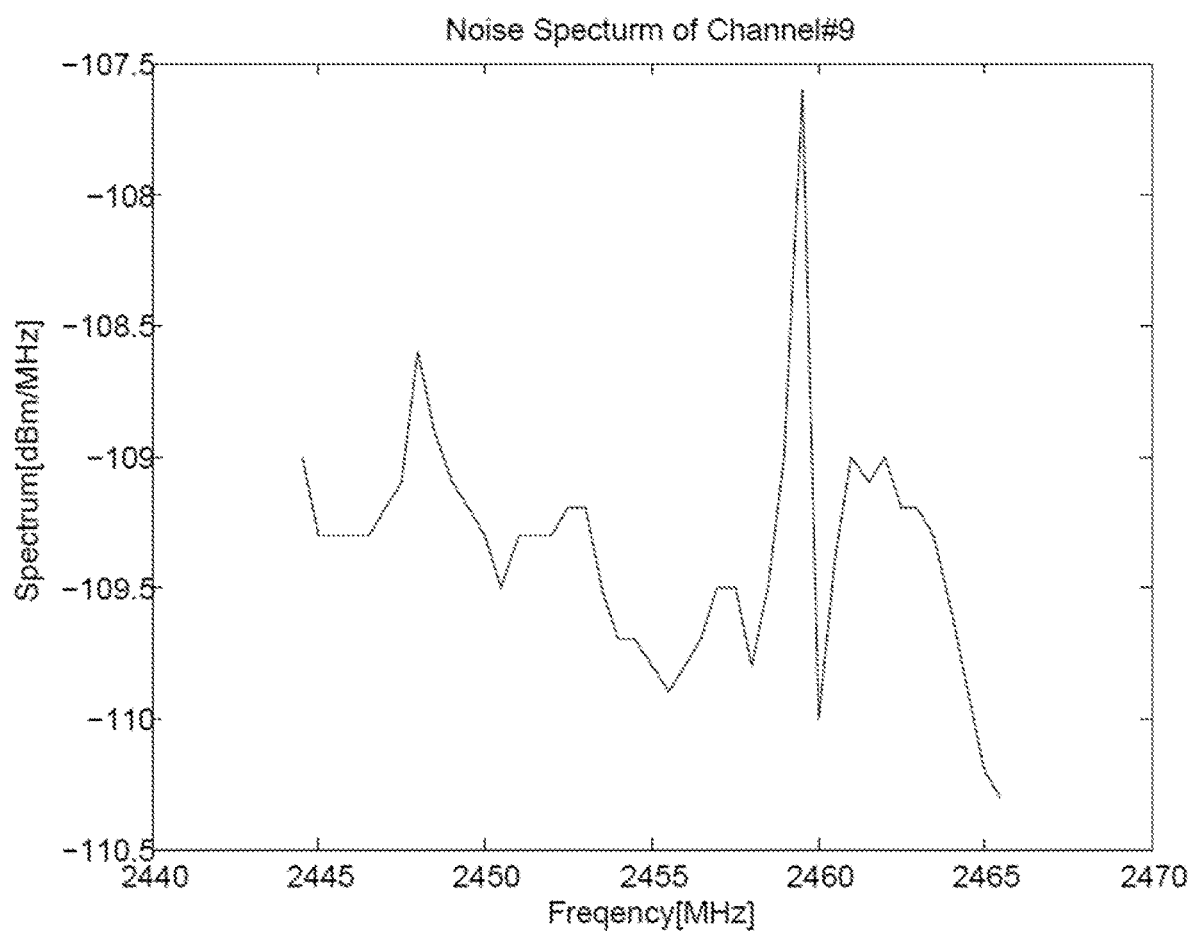
Figure 3D:
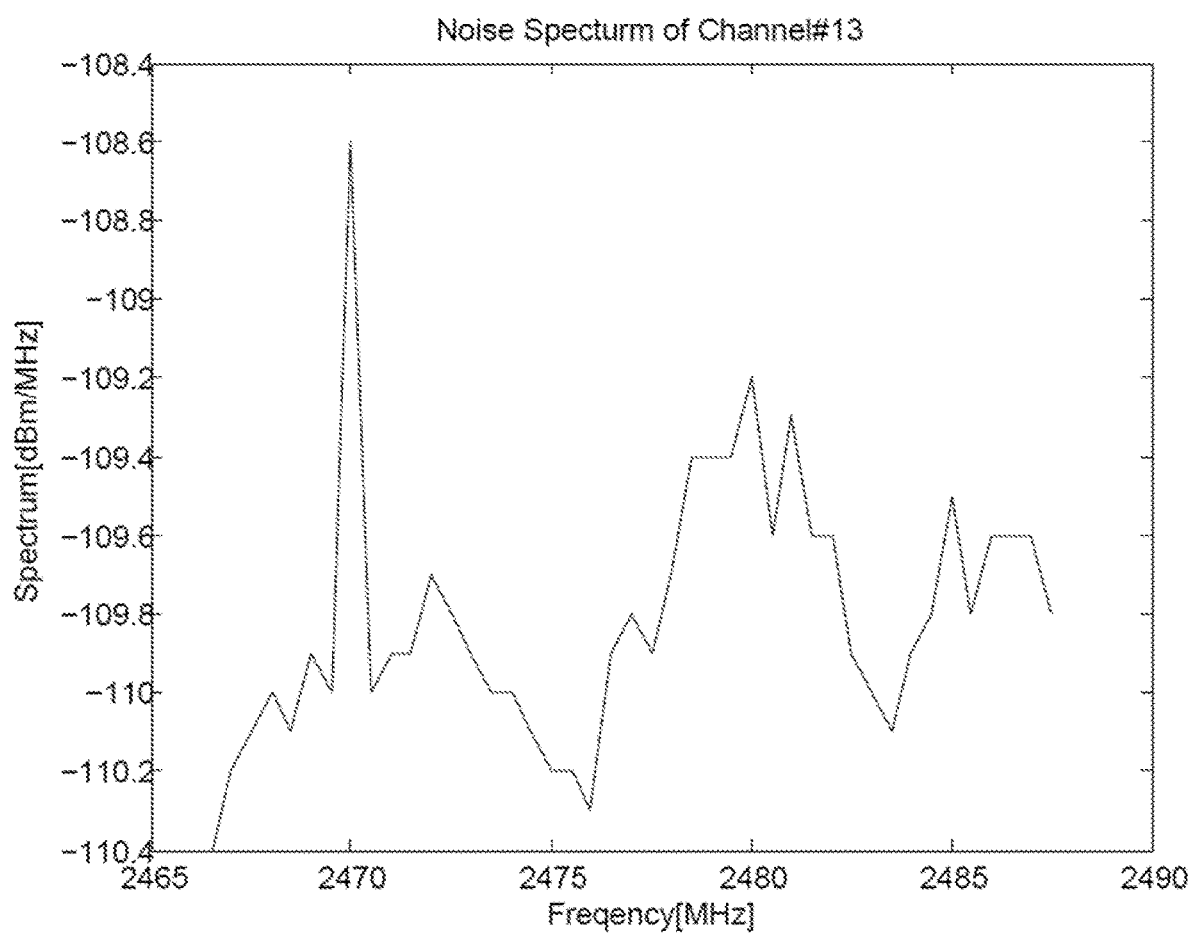

FIG. 2 shows a flowchart of an exemplary process for selecting a working wireless communication channel in accordance with some embodiments of the disclosure.

At 210, a working frequency band of a wireless communication device is obtained. The working frequency band can include a set of wireless communication channels. Each wireless communication channel corresponds to a channel frequency band within the working frequency band.

In some embodiments, the working frequency band is an unlicensed frequency band as discussed above, i.e., the wireless communication device can detect a wireless network within the unlicensed frequency band. The unlicensed frequency band can be any suitable unlicensed frequency band, including, but not limited to, 2.4 GHz Wi-Fi, 3.6 GHz Wi-Fi, 5 GHz Wi-Fi, BlueTooth, HiperLAN, etc.

According to different country/local-specific compliance requirements, the unlicensed frequency band may have a different working frequency band, and include a different set of wireless communication channels. Each wireless communication channel may correspond to a different channel frequency band.

For example, in China, the 5 GHz Wi-Fi has a working frequency band from about 5.15 GHz to about 5.85 GHz and includes a set of 20 wireless communication channels. In the set of 20 wireless communication channels of the 5 GHz Wi-Fi, 13 wireless communication channels have a 20 MHz bandwidth, 6 wireless communication channels have a 40 MHz bandwidth, and 1 wireless communication channel has an 80 MHz bandwidth.

As another example, the 2.4 GHz Wi-Fi in Japan has a working frequency band from about 2.401 GHz to about 2.495 GHz and includes a set of 14 wireless communication channels, i.e., all of the 14 wireless communication channels shown in FIG. 1. The set of 14 wireless communication channels can be assigned a channel number from 1 to 14, respectively. Each wireless communication channel has a 22 MHz bandwidth and a corresponding central frequency, as indicated in FIG. 1.

As still another example, the 2.4 GHz Wi-Fi in the United States has a working frequency band from about 2.401 GHz to about 2.472 GHz and includes a set of 11 wireless communication channels, i.e., the 11 lower frequency channels shown in FIG. 1. In China, the 2.4 GHz Wi-Fi has a working frequency band from about 2.401 GHz to about 2.483 GHz and includes a set of 13 wireless communication channels, i.e., the 13 lower frequency channels shown in FIG. 1.

Therefore, when the wireless communication device detects an unlicensed frequency band, the wireless communication device can obtain the working frequency band and the set of wireless communication channels of the working frequency band.

It is noted that, in some embodiments, the information of the working frequency band and the information of the set of wireless communication channels, including the information of the central frequency and the bandwidth for each wireless communication channel, can be provided in advance. For example, the information of various unlicensed frequency bands, and the country/local-specific compliance requirements may be stored in a memory of the wireless communication device. The wireless communication device can retrieve required information corresponding to the currently detected unlicensed frequency band.

In some embodiments, the wireless communication device can obtain the information of the working frequency band and the information of the set of wireless communication channels, including the information of the central frequency and the bandwidth for each wireless communication channel in real-time. For example, the wireless communication device may request the information corresponding to a to-be-connected unlicensed frequency band, and may receive such information from a server or a cloud service through a currently connected network.

Referring again to FIG. 2, at 220, a sub-set of the wireless communication channels from the set is determined. A number of wireless communication channels in the sub-set is smaller than a total number of wireless communication channels in the set. A superposition of the channel frequency bands of the wireless communication channels in the sub-set covers the working frequency band.

In the description below, a 2.4 GHz Wi-Fi band having a frequency range from about 2.401 GHz to about 2.483 GHz is used as an example of the working frequency band. Such a working frequency band includes a set of 13 wireless communication channels that correspond to the 13 lower frequency channels shown in FIG. 1. However, it should be noted that the disclosed methods, systems, and media can be applied to any suitable unlicensed wireless frequency band that includes multiple channels with overlapping bandwidth.

The 13 lower frequency channels of the 2.4 GHz Wi-Fi band, i.e., the channel numbers from 1 to 13 in FIG. 1, each have a bandwidth of about 22 MHz, and are spaced apart by a distance of about 5 MHz. Therefore, each channel has a frequency band overlapping with the frequency bands of adjacent channels. For example, Channel No. 6 has a frequency band from about 2.426 GHz to about 2.448 GHz, which overlaps with the frequency bands of channels No. 2 to No. 10.

Due to the frequency band overlapping among the channels in the working frequency band, a sub-set of channels can be selected from the set while a superposition of the channel frequency bands of the selected channels in the sub-set can still cover the entire working frequency band. It may be noted that the term "channel" and the term "wireless communication channel" can be interchangeable in accordance with some embodiments in the present disclosure.

For example, as illustrated in FIG. 1, the working frequency band from about 2.401 GHz to about 2.483 GHz of the 2.4 GHz Wi-Fi band includes the set of 13 channels. An exemplary sub-set of channels can be selected so that the channels have odd channel numbers. That is, the selected sub-set of channels can include Channel No. 1, Channel No. 3, Channel No. 5, Channel No. 7, Channel No. 9, Channel No. 11, and Channel No. 13. As another example, the sub-set of channels can be selected to include Channel No. 1, Channel No. 4, Channel No. 7, Channel No. 10, and Channel No. 13. The sub-set of channels can be selected as needed, as long as the superposition of the channel frequency bands of the channels in the sub-set covers the entire working frequency band.

In some embodiments, in order to select a minimum total number of channels for the sub-set, but still ensuring that the superposition of the channel frequency bands of the selected channels in the sub-set can cover the working frequency band, a frequency band overlap between each two neighboring selected channels in the sub-set can be minimized.

For example, to cover the working frequency band from about 2.401 GHz to about 2.483 GHz of the 2.4 GHz Wi-Fi band, Channel No. 1, Channel No. 5, Channel No. 9, and Channel No. 13 can be selected for the sub-set. That is, the minimum total number of selected channels of the sub-set is 4.

It is noted that, if the channels of the working frequency band have a same bandwidth, such as the 13 channels of the 2.4 GHz Wi-Fi band shown in FIG. 1, the selected channels in the sub-set can be substantially evenly distributed. In some working frequency bands, such as the 5 GHz Wi-Fi band, the channels have different bandwidths, the selected sub-set of channels can be determined based on the specific bandwidth of each channel, as long as the superposition of the channel frequency bands of the selected channels in the sub-set can cover the entire working frequency band.

In some situations, the bandwidth of a channel may not be stable due to spectral distortion, and the signal at band edges of the channel may be weak due to the sideband attenuation. Therefore, in some embodiments, in order to reduce or prevent errors, a suitable number of channels may be added into the sub-set having the minimum total number of selected channels to increase the overlap of frequency bands of the selected channels in the sub-set. As such, the reliability of the subsequent measurements and analyses may be improved.

For example, as discussed above, for the 2.4 GHz Wi-Fi band having 13 channels, the minimum total number of selected channels in the sub-set is 4. Nevertheless, 5 or more channels can be selected for the sub-set to increase the total number of selected channels. For example, if the sub-set includes 5 channels, the 5 selected channels can include Channel No. 1, Channel No. 4, Channel No. 7, Channel No. 10, and Channel No. 13. According to the present disclosure, the total number of selected channels can be equal to or be larger than the minimum total number of selected channels, but is smaller than the total number of channels in the working frequency band.

As described above, the total number of selected channels in the sub-set and the specific channel selection of the sub-set can be determined based on the information of the working frequency band, and the information of the set of wireless communication channels, including the information of central frequency and bandwidth for each wireless communication channel. The sub-set of wireless communication channels can be determined based on how such information is obtained.

In some embodiments, the sub-set of channels for various working frequency bands can be determined in advance. The information of the sub-set of channels can also be stored in a memory of the wireless commination device. For example, for the 2.4 GHz Wi-Fi band, the wireless commination device can be configured to select Channel No. 1, Channel No. 5, Channel No. 9, and Channel No. 13 for the sub-set.

In some embodiments, the sub-set of channels for various working frequency bands can be determined based on the information obtained in real-time by a hardware process of the wireless commination device. For example, the wireless commination device may determine that the 2.4 GHz Wi-Fi band, to which the wireless communication device will be working on, may suffer from an environmental disturbance, and therefore determine to select more channels than the minimum total number of selected channels, such as selecting the set of channels containing Channel No. 1, Channel No. 4, Channel No. 7, Channel No. 10, and Channel No. 13 as the sub-set for the 2.4 GHz Wi-Fi band.

Referring again to FIG. 2, at 230, a noise level measurement is performed on each of the wireless communication channels in the sub-set to obtain a spectral estimation result for each channel frequency band of the wireless communication channels in the sub-set.

In some embodiments, the wireless communication device can scan and monitor each channel in the sub-set by receiving noise signals from each channel in the sub-set. By using the spectral estimation technique to process the received noise signals in each channel in the sub-set, a noise spectral density distribution on the corresponding channel frequency band of each channel in the sub-set may be acquired. Hereinafter, the noise spectral density is also referred to as a "power spectral density" or simply a "spectral density," and the noise spectral density distribution is also referred to as a "noise spectral distribution" or "noise spectrum."

Spectral estimation is a signal processing method of analyzing the characteristics of random signals in a frequency domain and can be used to estimate the power spectral densities of a random signal sequence. In some embodiments, Fourier transform can be used for spectral estimation. For example, periodogram method, Blackman-Tukey, Bartlett, or any other suitable spectral estimation algorithm that is implemented by using fast Fourier transform can be applied to obtain a noise spectral distribution on the corresponding channel frequency band of a channel in the sub-set.

FIGS. 3A-3D show schematic diagrams of exemplary spectral density measuring results of selected wireless communication channels in accordance with some embodiments of the disclosure. In the example shown in FIGS. 3A-3D, the spectral estimation is performed by using the periodogram method for the selected wireless communication channels. Specifically, FIGS. 3A-3D show the measured noise spectra, i.e., power spectral density distributions, based on the noise measurements for Channel No. 1, Channel No. 5, Channel No. 9, and Channel No. 13, respectively, of the 2.4 GHz Wi-Fi band having 13 channels described above. These four channels can be used as the measurement channels, and the bandwidth of each measurement channel is about 22 MHz. That is, for each measurement channel, the bandwidth for receiving noise data is about 22 MHz.

The resolution of the spectral estimation can be configured based on actual requirements. For example, the resolution of the spectral estimation can be set to 1 MHz. That is, the spectral density can be measured based on a step length of 1 MHz.

Referring again to FIG. 2, at 240, a spectral density distribution across the working frequency band is calculated based on the spectral estimation results of the channel frequency bands of the wireless communication channels in the sub-set. Since the superposition of channel frequency bands of the selected channels in the sub-set can cover the entire working frequency band, a superposition of the obtained noise spectral distributions on the corresponding channel frequency bands of the selected channels in the sub-set can also cover the entire working frequency band.

In each region of the corresponding channel frequency band of each channel in the sub-set that does not overlap with the channel frequency band of another channel, the spectral estimation result can be directly used as the spectral density distribution of the corresponding region in the working frequency band. Such a region is also referred to as a "non-overlapping region." On the other hand, in each region of the corresponding channel frequency band of each channel in the sub-set that overlaps with the channel frequency band of another channel, for each frequency point in accordance with the resolution, there are at least two estimated spectral densities obtained from the overlapping channels. Such a region is also referred to as an "overlapping region."

In some embodiments, the spectral density value at a frequency point in an overlapping region can be obtained by averaging the spectral estimation results at that frequency point obtained from the overlapping channels in the sub-set. In some embodiments, the spectral density value at the frequency point in the overlapping region can be one selected from the spectral estimation results at that frequency point obtained from the overlapping channels in the sub-set.

Figure 4:
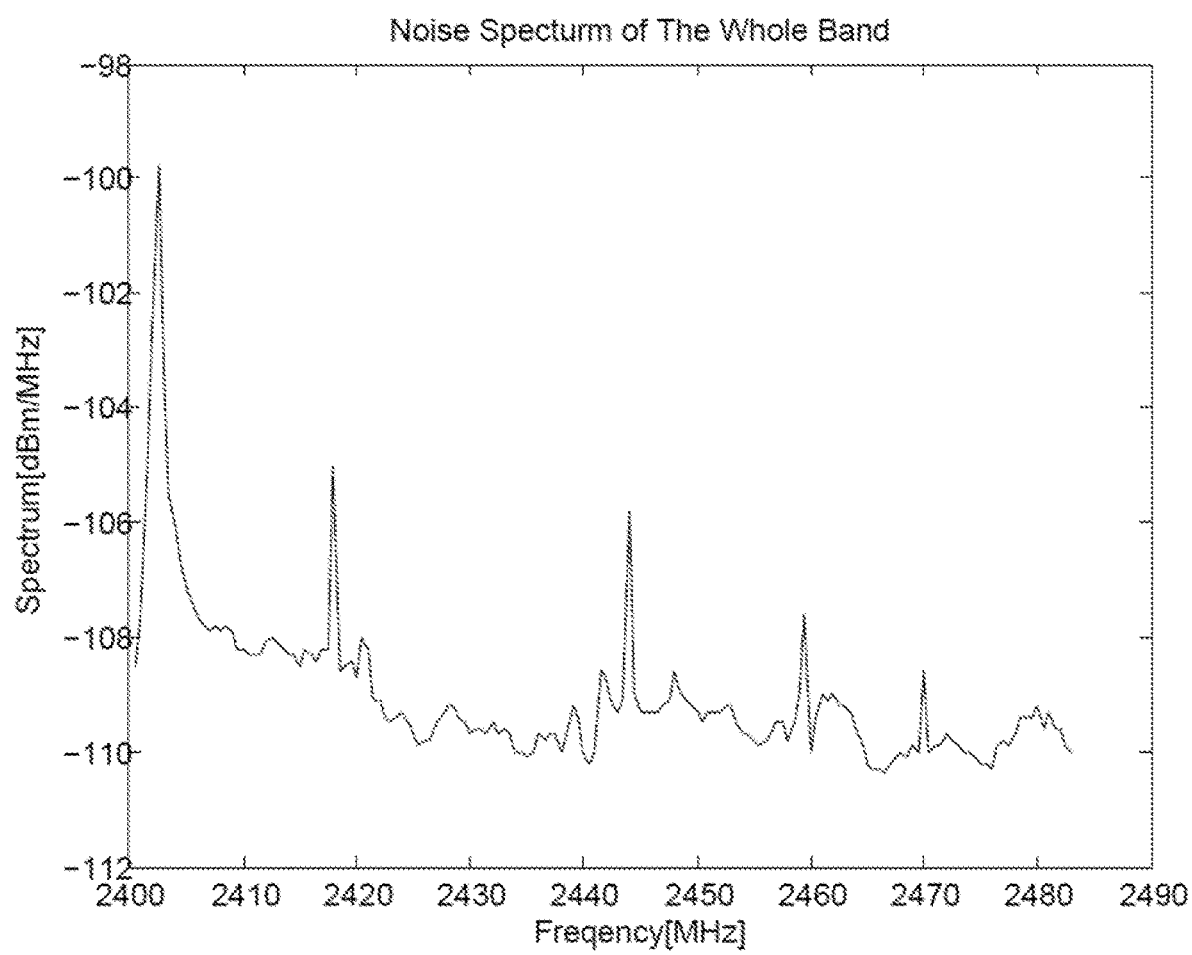
FIG. 4 illustrates a schematic diagram of an exemplary spectral density distribution of an unlicensed frequency band in accordance with some embodiments of the disclosure.

FIG. 4 shows a schematic diagram of an exemplary spectral density distribution of the working frequency band, which is an unlicensed frequency band, in accordance with some embodiments of the disclosure. Specifically, FIG. 4 shows the noise spectral density distribution over the working frequency band from about 2.401 GHz to about 2.483 GHz of the 2.4 GHz Wi-Fi band obtained based on the noise spectra for Channel No. 1, Channel No. 5, Channel No. 9, and Channel No. 13 shown in FIGS. 3A-3D. In the example shown in FIG. 4, the spectral densities in an overlapping region are obtained by averaging the spectral estimation results of the overlapping channels in the overlapping region.

Referring again to FIG. 2, at 250, according to the spectral density distribution across the working frequency band, one of the wireless communication channels is selected from the set as the working wireless communication channel.

In some embodiments, the selection of the working wireless communication channel can be performed based on noise interference statuses of the wireless communication channels in the set. The noise interference status of the corresponding channel frequency band of each channel in the set can be determined based on the spectral density distribution across the working frequency band using a suitable statistical method, as described below.

Figure 5:
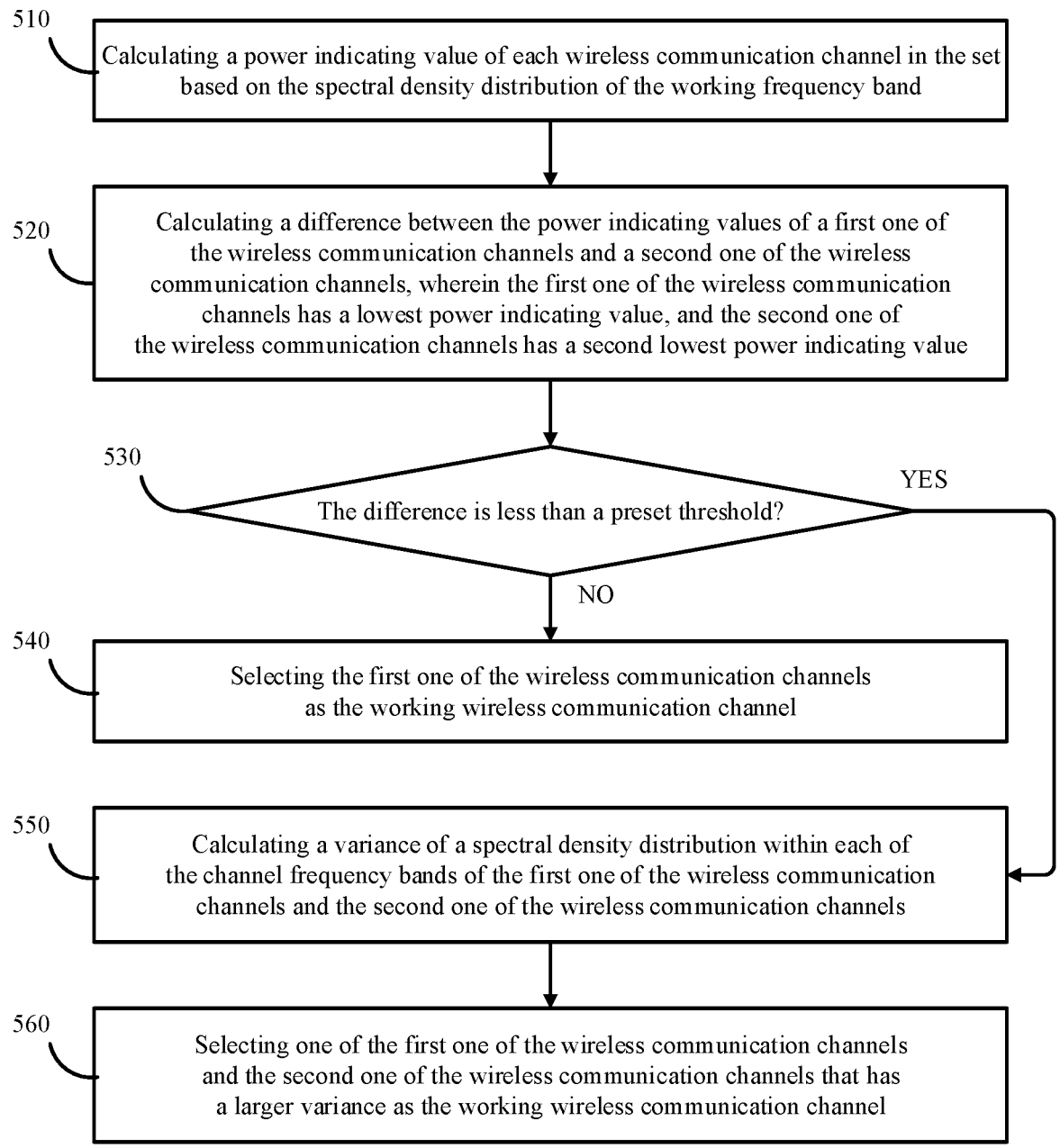
FIG. 5 illustrates a flowchart of an exemplary process for selecting a working wireless communication channel based on noise interference in accordance with some embodiments of the disclosure.

FIG. 5 shows an exemplary process for selecting the working wireless communication channel based on noise interference in accordance with some embodiments of the present disclosure. In some embodiments, a power indicating value of a wireless communication channel, which reflects the noise interference status of the channel, can be used in determining the working wireless communication channel. That is, the power indicating values of a plurality of wireless communication channels in the set can be compared with each other to select the working wireless communication channel, as described in more detail below.

As shown in FIG. 5, at 510, the power indicating value of each of a plurality of wireless communication channels in the set is calculated based on the spectral density distribution of the working frequency band. These plurality of wireless communication channels are also referred to as "candidate wireless communication channels" or "candidate channels." In some embodiments, all of the wireless communication channels in the working frequency band are taken into consideration for selecting the working wireless communication channel, i.e., all of the wireless communication channels in the working frequency band are the candidate channels. In some embodiments, some but not all of the wireless communication channels in the working frequency band are considered, i.e., the number of the candidate channels is smaller than the total number of channels in the working frequency band.

In some embodiments, the power indicating value of a wireless communication channel can be a total power of the channel, which can be calculated by, for example, integrating the power density distribution across the channel frequency band of the channel. In some embodiments, the total power of a wireless communication channel can be calculated by averaging the power spectral density values within the corresponding channel frequency band of the channel and then multiplying the average power spectral density by the frequency range of the channel.

In some other embodiments, the power indicating value is not the total power itself but a value related to the total power of the channel. For example, the power indicating value can be a weighted total power calculated based on all of the power spectral density values within the corresponding channel frequency band of the channel. In one embodiment, the weighted total power can be a reciprocal of a summation of the reciprocals of the all of the power spectral density values within the corresponding channel frequency band of the channel respectively. As another example, the power indicating value can be a value obtained by averaging all of the power spectral density values within the corresponding channel frequency band of the channel. Further, if the numbers of power spectral density values in different channel frequency bands are the same, the power indicating value can be a value obtained by directly summing all of the power spectral density values within the corresponding channel frequency band of the channel.

In some embodiments, one channel that has a lowest power indicating value among the channels in the set can be directly selected as the working wireless communication channel for connecting the wireless communication device to the wireless communication network implemented in the working frequency band. In some embodiments, some other optimization factors, such as the interference distribution, etc., may be taken into account to obtain a more reliable selection result, as described in more detail below.

At 520, a difference between the power indicating value of a first one of the candidate wireless communication channels and the power indicating value of a second one of the candidate wireless communication channels is calculated. The first one of the candidate wireless communication channels has a lowest power indicating value, and the second one of the candidate wireless communication channels has a second lowest power indicating value. In some embodiments, the difference between the power indicating values includes a geometric difference, i.e., a ratio, between the power indicating values. In some other embodiments, the difference between the power indicating values includes an arithmetic difference between the power indicating values.

At 530, the difference calculated above is compared with a preset threshold to determine whether the difference is less than the preset threshold. That is, if the power indicating value of the first one of the candidate wireless communication channel and the power indicating value of the second one of the candidate wireless communication channels are very close to each other, the interference distribution in each of these two channels may be further investigated. In some embodiments, the total power of a wireless communication channel is used as the power indicating value of the channel, and the preset threshold can be, for example, 1 dB.

In response to determining that the difference is not less than the preset threshold (530: "NO"), the first one of the candidate wireless communication channels is selected as the working wireless communication channel at 540. That is, the channel that has the lowest power indicating value among the candidate channels is selected as the working wireless communication channel for connecting the wireless communication device to the wireless communication network implemented in the working frequency band.

On the other hand, in response to determining that the difference is less than the preset threshold (530: "YES"), the process proceeds to 550 to calculate a variance of the spectral density distribution within each of the channel frequency band of the first one of the candidate wireless communication channels and the channel frequency band of the second one of the candidate wireless communication channels. The variance of the spectral density distribution of one channel can indicate a fluctuation degree of the interference spectrum of the channel. A channel having a larger variance of the spectral density distribution may have a larger fluctuation degree of the interference spectrum.

At 560, one of the first one of the candidate wireless communication channels and the second one of the candidate wireless communication channels that has a larger variance is selected as the working wireless communication channel. Because a method such as interleaving mapping is implemented, bursts in time-frequency domain can be better resisted.

Generally, a larger transmission bandwidth of a wireless communication channel, also referred to as a "channel working bandwidth," can provide a larger signal-transmission capacity, also referred to as a "channel capacity." To achieve the maximum signal-transmission capacity, the entire channel frequency band of the wireless communication channel, such as the 22 MHz bandwidth in the 2.4 GHz Wi-Fi, can be used for signal transmission. Thus, as described above, the noise interference across the entire channel frequency band of the channel is considered in determining the power indicating value for the channel. However, a larger transmission bandwidth may result in a higher noise interference, i.e., it may be more difficult to avoid the impact of the noise interference. Therefore, in some embodiments, a narrowed channel frequency band having a narrowed channel working bandwidth, such as a 20 MHz narrowed channel frequency band having a narrowed channel working bandwidth of about 20 MHz or a 10 MHz narrowed channel frequency band having a narrowed channel working bandwidth of about 10 MHz in the 2.4 GHz Wi-Fi, of a wireless communication channel can be used for signal transmission. In these embodiments, the noise interference across the entire channel frequency band of a certain channel may not correctly reflect the noise interference in the narrowed channel frequency band of the channel, and thus the noise interference of the channel may need to be determined with respect to the narrowed channel frequency band.

In the embodiments using a narrowed channel working bandwidth, such as the 20 MHz or 10 MHz narrowed bandwidth in the 2.4 GHz Wi-Fi, selection of the working wireless communication channel can be performed in a manner similar to that in the exemplary embodiments described above in connection with FIG. 5, except that the narrowed channel frequency band, rather than the entire channel frequency band, is considered during calculation and/or determination. For example, in a process corresponding to process 510 for calculating the power indicating value for a channel, instead of the value calculated based on all of the power spectral density values in the entire channel frequency band of the channel, such as the total power of the entire channel frequency band or the value related to the total power of the entire channel frequency band, a value calculated based on the power spectral density values in the narrowed channel frequency band is used as the power indicating value, such as a total power in the narrowed channel frequency band or a value related to the total power in the narrowed channel frequency band. As another example, in a process corresponding to process 550 for calculating the variance of the spectral density distribution in the channel, instead of the variance across the entire channel frequency band, a variance across the narrowed channel frequency band is calculated. Detailed description of determining the working wireless communication channel in the scenario of a narrowed channel frequency bandwidth is omitted.

In some embodiments, the working frequency band of the wireless communication device allows transmission at one of a plurality of different narrowed channel working bandwidths, such as the 20 MHz narrowed bandwidth and the 10

MHz narrowed bandwidth in the 2.4 GHz Wi-Fi having an entire channel bandwidth of about 22 MHz. In these embodiments, an optimal wireless communication channel for each of the narrowed channel working bandwidths can be determined and then the optimal wireless communication channels of different bandwidths can be compared to determine the working wireless communication channel. The comparison can be based on data transmission rates of the optimal wireless communication channels of the different bandwidths, as described in more detail below in connection with FIG. 6.

Figure 6:
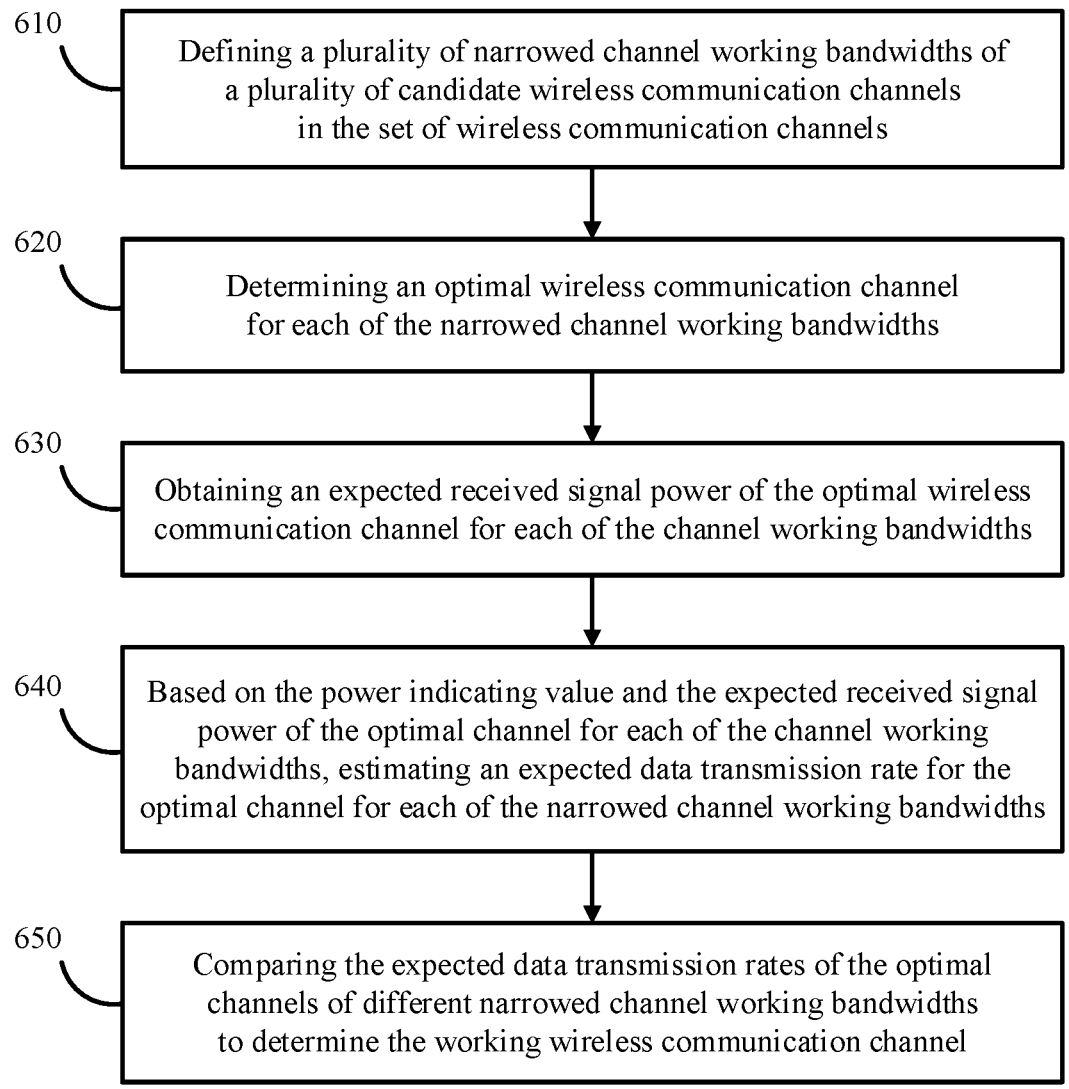
FIG. 6 illustrates a flowchart of an exemplary process for selecting a working wireless communication channel based on data transmission rate in accordance with some embodiments of the disclosure.

FIG. 6 shows a flowchart of an exemplary process for selecting a working wireless communication channel based on data transmission rate consistent with embodiments of the disclosure.

As shown in FIG. 6, at 610, a plurality of narrowed channel working bandwidths of a plurality of candidate wireless communication channels in the set of wireless communication channels are defined. Similar to that described above, the candidate wireless communication channels can include all of the wireless communication channels in the set or less than all of the channels in the set. For example, the candidate wireless communication channels can include all of the wireless communication channels in the set of wireless communication channels of the working frequency band. As another example, the candidate wireless communication channels can include the sub-set of the wireless communication channels of the working frequency band determined at 220 described above in connection with FIG. 2.

Each of the narrowed channel working frequency bandwidths is narrower than the original bandwidth(s) of the plurality of wireless communication channels. That is, for each of the wireless communication channels, a plurality of narrowed channel frequency bands each having one of the narrowed channel working bandwidths can be defined.

For example, for the 2.4 GHz Wi-Fi band, 13 wireless communication channels have a 22 MHz original channel bandwidth, i.e., the 13 lower frequency channels shown in FIG. 1. In this example, the narrowed channel working bandwidths can be defined to include the 10 MHz narrowed channel working bandwidth and the 20 MHz narrowed channel working bandwidth. In some embodiments, both the 10 MHz narrowed channel and the 20 MHz narrowed channel may be used to conduct a noise level measurement (e.g., spectral density estimation, etc.) on each of the 13 lower frequency channels or each of the 14 channels respectively (26 measurements or 28 measurements). And the channel with the least interference may be selected as the working wireless communication channel.

Using Channel 1 as an example, the central frequency of Channel 1 is about 2.412 GHz, the band range of Channel 1 is from about 2.401 GHz to about 2.423 GHz, and the bandwidth of Channel 1 is about 22 MHz. For a 10 MHz narrowed channel frequency band of Channel 1, the central frequency can still be about 2.412 GHz, and the band range of the 10 MHz narrowed channel frequency band of Channel 1 is from about 2.407 GHz to about 2.417 GHz. For a 20 MHz narrowed channel frequency band of Channel 1, the central frequency can be still about 2.412 GHz, and the band range of the 20 MHz narrowed channel frequency band of Channel 1 is from about 2.402 GHz to about 2.422 GHz.

At 620, an optimal wireless communication channel for each of the narrowed channel working bandwidths is determined. That is, a plurality of optimal wireless communication channels are determined, each of which corresponds to one of the narrowed channel working bandwidths. The optimal wireless communication channel for a narrowed channel working bandwidth can be determined, for example, according to the embodiments described above for selecting the working wireless communication channel in the situation that a narrowed channel working bandwidth is used for signal transmission. That is, in the embodiments described here in connection with FIG. 6, the channel determined according to the exemplary methods described above is not directly used as the working wireless communication channel, but as a candidate for further comparison and determination.

At 630, an expected received signal power of the optimal wireless communication channel for each of the channel working bandwidths is obtained. In some embodiments, to determine the expected received signal power for an optimal wireless communication channel, one or more testing signals can be transmitted through the optimal channel to the wireless commination device. The wireless commination device can receive the one or more testing signals to estimate the expected received signal power.

At 640, based on the power indicating value and the expected received signal power of the optimal channel for each of the channel working bandwidths, an expected data transmission rate is estimated for the optimal channel for each of the narrowed channel working bandwidths.

The power indicating value of an optimal channel for a narrowed channel working bandwidth can be any suitable power indicating value, such as one of those exemplary power indicating values described above, e.g., the total power, or the value related to the total power, in the narrowed frequency band of the optimal channel for the narrowed channel working bandwidth.

In some embodiments, one or more data throughputs for each of the optimal channels corresponding to the narrowed channel working bandwidths can be calculated to indicate the expected data transmission rates of the optimal channels corresponding to the narrowed channel working bandwidths, respectively. A larger data throughput corresponds to a higher expected data transmission rate. In some embodiments, the data throughput of an optimal channel can be determined based on the corresponding narrowed channel working bandwidth, the power indicating value of the optimal channel, and the expected received signal power corresponding to the optimal channel.

In some embodiments, the data throughput of an optimal channel can be determined by checking the corresponding narrowed channel working bandwidth, power indicating value, and expected received signal power against a data throughput table. To establish the data throughput table, multiple data throughputs can be measured in advance at various signal to noise ratios and various bandwidths under an Additive White Gaussian Noise (AWGN) environment. To determine the data throughput of an optimal channel, the signal to noise ratio can be calculated by dividing the expected received signal power by the power indicating value of the optimal channel. The calculated signal to noise ratio and the corresponding narrowed channel working bandwidth can be checked against the data throughput table to determine the corresponding data throughput. The expected data transmission rate of an optimal channel can be determined according to the data throughput of the optimal channel.

At 650, the expected data transmission rates of the optimal channels of different narrowed channel working bandwidths are compared to determine the working wireless communication channel. In some embodiments, one of the optimal channels that has a highest expected data transmission rate can be selected as the working wireless communication channel. The central frequency of the selected optimal channel can be used as a working wireless communication central frequency, and the narrowed channel working bandwidth corresponding to the selected optimal channel can be used as a working frequency bandwidth for connecting the wireless communication device to the wireless communication network.

It is noted that the above processes of the flow diagrams of FIGS. 2, 5 and 6 can be executed or performed in any order or sequence not limited to the order and sequence shown in the figures and described above. Also, some of the above processes of the flow diagrams of FIGS. 2, 5 and 6 can be executed or performed substantially simultaneously where appropriate or in parallel to reduce latency and processing time. Furthermore, it is noted that FIGS. 2, 5 and 6 are provided as examples only. At least some of the processes shown in the figures may be performed in a different order than represented, performed concurrently, or altogether omitted.

Figure 7:
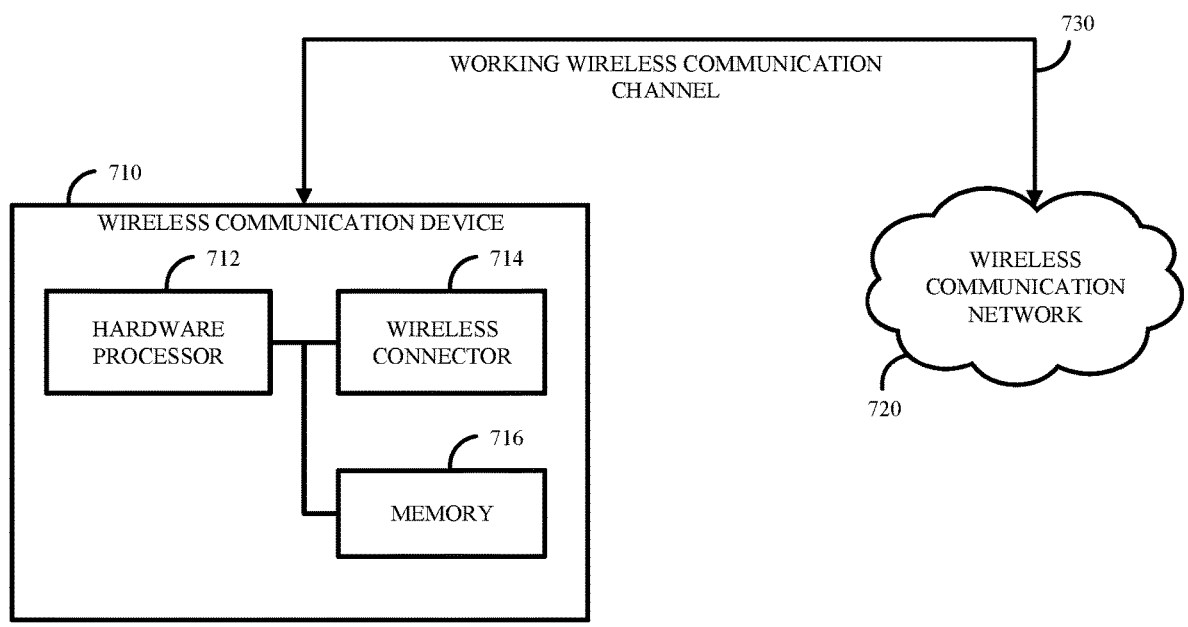
FIG. 7 illustrates a schematic structural diagram of an exemplary system for selecting a working wireless communication channel in accordance with some embodiments of the disclosure.

FIG. 7 shows a schematic structural diagram of an exemplary system for selecting a working wireless communication channel in accordance with some embodiments of the disclosure. As shown in FIG. 7, the system includes a wireless communication device 710 configured to detect a wireless communication network 720, select a working wireless communication channel 730 to connect to the wireless communication network 720, process and transmit/receive data, and/or perform any other suitable function.

For example, the wireless communication device 710 can be an unmanned aerial vehicle (UAV), an autonomous vehicle, a mobile phone, a tablet computer, a laptop computer, a streaming media player, a vehicle entertainment system, and/or any other suitable device that includes a wireless communication function.

The wireless communication device 710 includes a hardware processor 712, a wireless connector 714, and a memory 716. In some embodiments, the wireless communication device 710 may further include an input device controller, an input device, an output circuitry, a communication interface, a bus, and/or any other suitable components.

The hardware processor 712 can include any suitable hardware processor, such as a microprocessor, a microcontroller, a central processing unit (CPU), a network processor (NP), a digital signal processor (DSP), an application specific integrated circuit (ASIC), a field-programmable gate array (FPGA), or another programmable logic device, discrete gate or transistor logic device, discrete hardware component. The hardware processor 712 is configured to implement or execute part or all of a method consistent with the disclosure, such as one of the exemplary methods described above. For example, the hardware processor 712 may perform the processes at 230, 240, and 250 described above in connection with FIG. 2.

The wireless connector 714 can be any suitable circuitry for interfacing with one or more wireless communication networks, such as the wireless communication network 720 implementing an unlicensed band in some embodiments. For example, the wireless connector 714 can include a wireless network interface card circuitry, a wireless communication circuitry, an antenna, and/or any other suitable circuitry for interfacing with one or more wireless communication networks, such as the Internet, a Wi-Fi network, a BlueTooth network, a wide area network, a local network, a metropolitan area network, etc. The wireless connector 714 may include a Wi-Fi chip.

In some embodiments, the wireless communication network 720 can be any suitable combination of one or more wireless networks such as a wireless personal area network (WPAN), a wireless local area network (WLAN), a wireless ad hoc network, a wireless metropolitan area network (WMAN), a wireless wide area network (WWAN), a global area network (GAN), a Wi-Fi network, a WiMax network, a satellite network, a mobile phone network, a mobile data network, and/or any other suitable communication network, or any combination of any of such networks.

The wireless communication network 720 can implement one or more unlicensed bands, including but not limited to 2.4 GHz Wi-Fi, 3.6 GHz Wi-Fi, 5 GHz Wi-Fi, BlueTooth, HiperLAN, etc. The wireless connector 714 can connect the wireless communication device 710 to the wireless communication network 720 through the working wireless communication channel 730 selected by using a method consistent with the disclosure, such as one of the exemplary methods described above.

The memory 716 can be any suitable memory and/or storage for storing programs, data, instructions, information of working frequency bands (such as unlicensed frequency bands), information of wireless communication channels, and/or any other suitable content in some embodiments. For example, the memory 716 can include a random access memory (RAM), read only memory, flash memory, non-volatile memory, such as hard disk storage, optical media, and/or any other suitable storage device. In some embodiments, the memory 716 includes a non-transitory computer-readable storage medium storing instructions that, when executed by the hardware processor 712, cause the hardware processor 712 to perform a method consistent with the disclosure, such as one of the above-described exemplary methods.

In some embodiments, the wireless communication device 710 further includes a bus for communicating between two or more of components of the wireless communication device 710. The bus may be divided into an address bus, a data bus, a control bus, etc.

The processes of the disclosed method in various embodiments can be directly executed by a hardware decoding processor, or by a decoding processor including a hardware module and a software module. The software module may reside in any suitable storage/memory medium, such as a random access memory, a flash memory, a read-only memory, a programmable read-only memory, an electrically erasable programmable memory, a register, etc. The storage medium can be located in the memory 716. The hardware processor 712 can implement the processes of the disclosed method by using the hardware and the information read from the memory 716.

Figure 8:
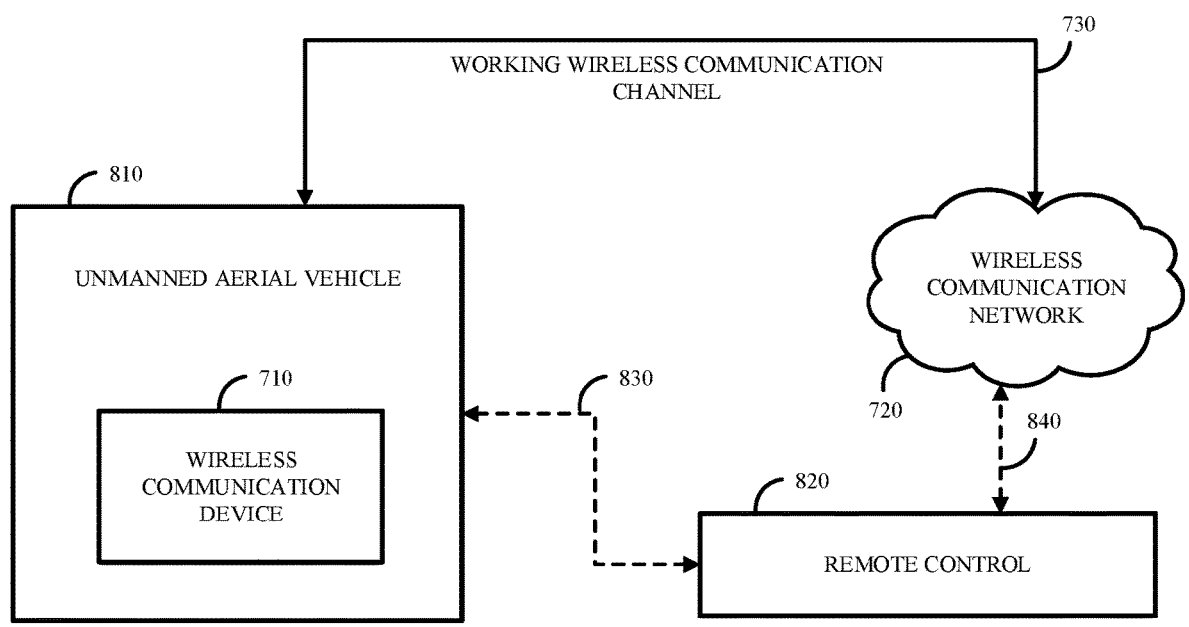
FIG. 8 illustrates a schematic structural diagram of an unmanned aerial vehicle for selecting a working wireless communication channel in accordance with some embodiments of the disclosure.

FIG. 8 illustrates a schematic structural diagram of an unmanned aerial vehicle 810 in accordance with some embodiments of the disclosure. As shown in in FIG. 8, the unmanned aerial vehicle 810 includes the wireless communication device 710 as illustrated in FIG. 7, and any other suitable components, such as a housing, a power system, a flight control system, one or more cameras, etc. The housing can be used to contain or hold various components of the unmanned aerial vehicle 810, such as the wireless communication device 710. The wireless communication device 710 can be configured to detect a wireless communication network 720, select a working wireless communication channel 730 to connect the unmanned aerial vehicle 810 and the wireless communication network 720, process and transmit data, and/or perform any other suitable function.

In some embodiments, the unmanned aerial vehicle 810 can be controlled by a remote control 820. The remote control 820 can be a specific remote control device of the unmanned aerial vehicle 810, or can be a software application implemented on a mobile smart device, such as a smartphone, a tablet computer, etc.

In some embodiments, the unmanned aerial vehicle 810 can be coupled to the remote control 820 through a special wireless control signal link 830, such as an infrared signal link, a radar signal link, an optical signal link, etc. In some embodiments, the remote control 820 can be connected to the wireless communication network 720 through a wireless communication link 840, and the unmanned aerial vehicle 810 can be coupled to the remote control 820 through the working wireless communication channel 730 and the wireless communication network 720.

Accordingly, methods, systems, and media for selecting a working wireless communication channel based on spectral estimation are provided.

The flowcharts and blocks in the figures illustrate various embodiments of the disclosed methods and systems, as well as architectures, functions and operations that can be implemented by a computer program product. In this case, each block of the flowcharts or block diagrams may represent a module, a code segment, a portion of program code. Each module, each code segment, and each portion of program code can include one or more executable instructions for implementing predetermined logical functions.

It is also noted that, each block in the block diagrams and/or flowcharts, as well as the combinations of the blocks in the block diagrams and/or flowcharts, can be realized by a dedicated hardware-based system for executing specific functions, or can be realized by a dedicated system including hardware and computer instructions.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Further, it is understood that the present disclosure has been made only by way of example, and that numerous changes in the details of embodiment of the disclosure can be made without departing from the spirit and scope of the disclosure. Features of the disclosed embodiments can be combined and rearranged in various ways. Without departing from the spirit and scope of the disclosure, modifications, equivalents, or improvements to the disclosure are understandable to those skilled in the art and are intended to be encompassed within the scope of the present disclosure. It should be noted that, similar reference numerals and letters are refer to similar items in the figures, and thus once an item is defined in one figure, there is no need to further define and/or explain the item in subsequent figures.

What is claimed is:

1. A method for selecting a working wireless communication channel comprising:
    determining a sub-set of wireless communication channels from a set of wireless communication channels of a working frequency band, wherein a superposition of channel frequency bands of the wireless communication channels in the sub-set covers the working frequency band;
    performing a noise level measurement on each of the wireless communication channels in the sub-set to obtain a spectral estimation result for each channel frequency band of the wireless communication channels in the sub-set;
    calculating, by a hardware processor, a spectral density distribution across the working frequency band based on the spectral estimation results of the channel frequency bands of the wireless communication channels in the sub-set; and
    selecting, according to the spectral density distribution across the working frequency band, one of the wireless communication channels from the set as the working wireless communication channel.

2. The method of claim 1, wherein:
    determining the sub-set of the wireless communication channels includes selecting two or more of the wireless communication channels, such that a frequency band overlap between each two neighboring wireless communication channels in the sub-set is minimized.

3. The method of claim 1, wherein:
    performing the noise level measurement includes performing at least one of a periodogram method, a Blackman-Tukey method, or Bartlett method.

4. The method of claim 1, wherein performing the noise level measurement includes:
    measuring a channel spectral density distribution in the channel frequency band of each wireless communication channel in the sub-set.

5. The method of claim 4, wherein calculating the spectral density distribution of the working frequency band includes:
    calculating, based on the channel spectral density distributions in the channel frequency bands of the wireless communication channels in the sub-set, average spectral densities within overlapping regions between each two neighboring wireless communication channels in the sub-set.

6. The method of claim 1, wherein selecting one of the wireless communication channels from the set as the working wireless communication channel includes:
    calculating a power indicating value of each of a plurality of wireless communication channels in the set based on the spectral density distribution of the working frequency band; and
    selecting one wireless communication channel having a lowest power indicating value as the working wireless communication channel.

7. The method of claim 1, wherein selecting one of the wireless communication channels as the working wireless communication channel includes:
    calculating a power indicating value of each of the plurality of wireless communication channels in the set based on the spectral density distribution of the working frequency band;
    determining whether a difference between the total power densities of a first one of the wireless communication channels and a second one of the wireless communication channels is less than a preset threshold value, wherein the first one of the wireless communication channels has a lowest power indicating value, and the second one of the wireless communication channels has a second lowest power indicating value;
    calculating a variance of a spectral density distribution within each of the channel frequency bands of the first one of the wireless communication channels and the second one of the wireless communication channels; and
    selecting one of the first one of the wireless communication channels and the second one of the wireless communication channels that has a larger variance as the working wireless communication channel.

8. A wireless communication device, comprising:
a hardware processor configured to:
determine a sub-set of wireless communication channels from a set of wireless communication channels of a working frequency band, wherein a superposition of channel frequency bands of the wireless communication channels in the sub-set covers the working frequency band,
perform a noise level measurement on each of the wireless communication channels in the sub-set to obtain a spectral estimation result for each frequency band of the wireless communication channels in the sub-set,
calculate a spectral density distribution across the working frequency band based on the spectral estimation results of the channel frequency bands of the wireless communication channels in the sub-set, and
select, according to the spectral density distribution across the working frequency band, one of the wireless communication channels from the set as the working wireless communication channel; and
a wireless connector configured to connect the wireless communication device to a wireless communication network using the working wireless communication channel.

9. The system of claim 8, wherein the hardware processor is further configured to:
select two or more of the wireless communication channels from the set as the sub-set, such that a frequency band overlap between each two neighboring wireless communication channels in the sub-set is minimized.

10. The system of claim 8, wherein the hardware processor is further configured to:
perform the noise level measurement by using at least one of a periodogram method, a Blackman-Tukey method, or Bartlett method.

11. The system of claim 8, wherein the hardware processor is further configured to:
measure a channel spectral density distribution in the channel frequency band of each wireless communication channel in the sub-set.

12. The system of claim 11, wherein the hardware processor is further configured to:
calculate, based on the channel spectral density distributions in the channel frequency bands of the wireless communication channels in the sub-set, average spectral densities within overlapping regions between each two neighboring wireless communication channels in the sub-set.

13. The system of claim 8, wherein the hardware processor is further configured to:
calculate a power indicating value of each of a plurality of wireless communication channels in the set based on the spectral density distribution of the working frequency band; and
select one wireless communication channel having a lowest power indicating value as the working wireless communication channel.

14. The system of claim 8, wherein the hardware processor is further configured to:
calculate a power indicating value of each of the plurality of wireless communication channels in the set based on the spectral density distribution of the working frequency band;
determine whether a difference between the total power densities of a first one of the wireless communication channels and a second one of the wireless communication channels is less than a preset threshold value, wherein the first one of the wireless communication channels has a lowest power indicating value, and the second one of the wireless communication channels has a second lowest power indicating value;
calculate a variance of a spectral density distribution within each of the channel frequency bands of the first one of the wireless communication channels and the second one of the wireless communication channels; and
select one of the first one of the wireless communication channels and the second one of the wireless communication channels that has a larger variance as the working wireless communication channel.

15. An unmanned aerial vehicle, comprising:
a housing;
a hardware processor held by the housing and configured to:
determine a sub-set of wireless communication channels from a set of wireless communication channels of a working frequency band, wherein a superposition of channel frequency bands of the wireless communication channels in the sub-set covers the working frequency band,
perform a noise level measurement on each of the wireless communication channels in the sub-set to obtain a spectral estimation result for each frequency band of the wireless communication channels in the sub-set,
calculate a spectral density distribution across the working frequency band based on the spectral estimation results of the channel frequency bands of the wireless communication channels in the sub-set, and
select, according to the spectral density distribution across the working frequency band, one of the wireless communication channels from the set as the working wireless communication channel; and
a wireless connector held by the housing and configured to connect the unmanned aerial vehicle to a wireless communication network using the working wireless communication channel.

16. The unmanned aerial vehicle of claim 15, wherein the hardware processor is further configured to:
select two or more of the wireless communication channels from the set as the sub-set, such that a frequency band overlap between each two neighboring wireless communication channels in the sub-set is minimized.

17. The unmanned aerial vehicle of claim 15, wherein the hardware processor is further configured to:
perform the noise level measurement by using at least one of a periodogram method, a Blackman-Tukey method, or Bartlett method.

18. The unmanned aerial vehicle of claim 15, wherein the hardware processor is further configured to:
measure a channel spectral density distribution in the channel frequency band of each wireless communication channel in the sub-set; and
calculate, based on the channel spectral density distributions in the channel frequency bands of the wireless communication channels in the sub-set, average spectral densities within overlapping regions between each two neighboring wireless communication channels in the sub-set.

19. The unmanned aerial vehicle of claim 15, wherein the hardware processor is further configured to:
- calculate a power indicating value of each of a plurality of wireless communication channels in the set based on the spectral density distribution of the working frequency band; and
- select one wireless communication channel having a lowest power indicating value as the working wireless communication channel.

20. The unmanned aerial vehicle of claim 15, wherein the hardware processor is further configured to:
- calculate a power indicating value of each of the plurality of wireless communication channels in the set based on the spectral density distribution of the working frequency band;
- determine whether a difference between the total power densities of a first one of the wireless communication channels and a second one of the wireless communication channels is less than a preset threshold value, wherein the first one of the wireless communication channels has a lowest power indicating value, and the second one of the wireless communication channels has a second lowest power indicating value;
- calculate a variance of a spectral density distribution within each of the channel frequency bands of the first one of the wireless communication channels and the second one of the wireless communication channels; and
- select one of the first one of the wireless communication channels and the second one of the wireless communication channels that has a larger variance as the working wireless communication channel.

* * * * *